Nov. 30, 1948.  J. R. CLARK  2,454,860
PORTABLE ELEVATOR FOR LOADING TRUCKS
Filed Jan. 29, 1946  4 Sheets—Sheet 1
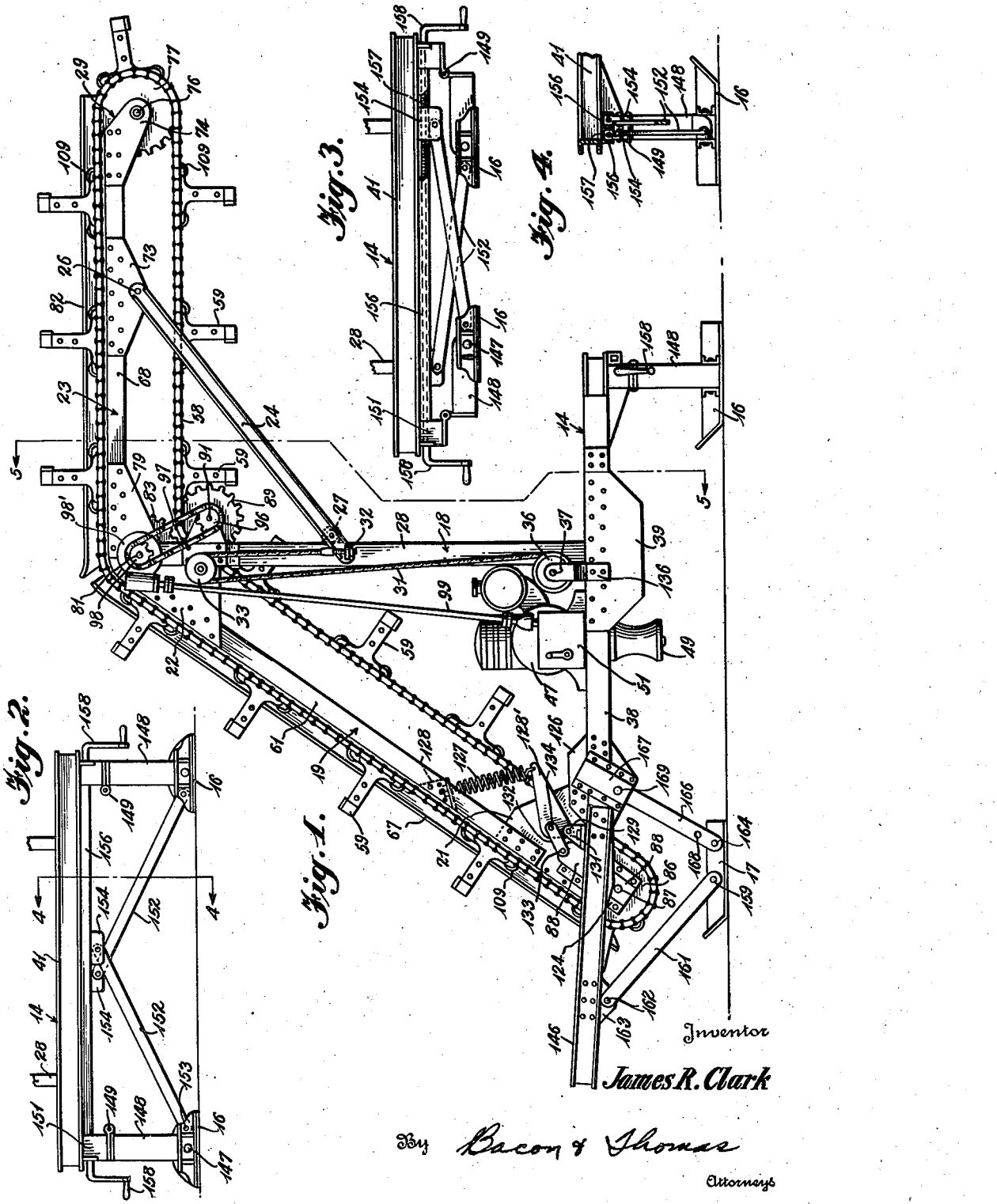
Inventor
James R. Clark
By Bacon & Thomas
Attorneys Nov. 30, 1948.  J. R. CLARK  2,454,860
PORTABLE ELEVATOR FOR LOADING TRUCKS
Filed Jan. 29, 1946  4 Sheets-Sheet 2
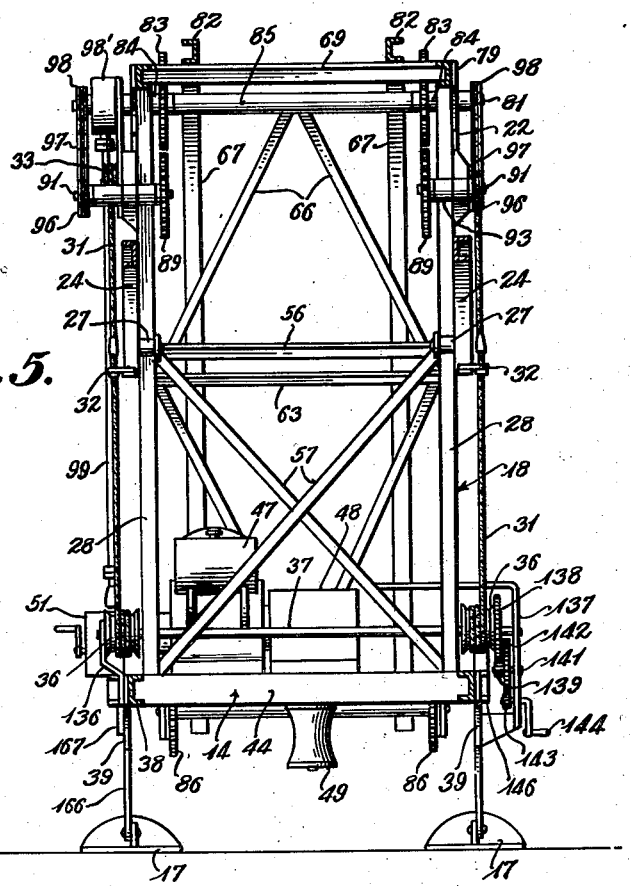
Fig. 5.
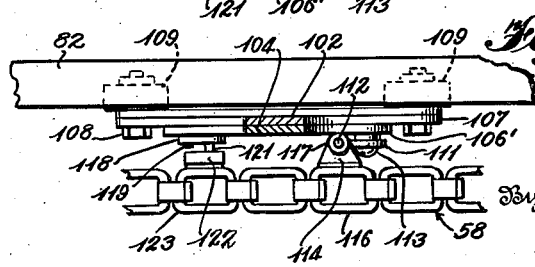
Fig. 8.
Fig. 9.
Fig. 10.
Inventor
James R. Clark
By Bacon & Thomas
Attorneys Nov. 30, 1948.  J. R. CLARK  2,454,860
PORTABLE ELEVATOR FOR LOADING TRUCKS
Filed Jan. 29, 1946  4 Sheets-Sheet 3
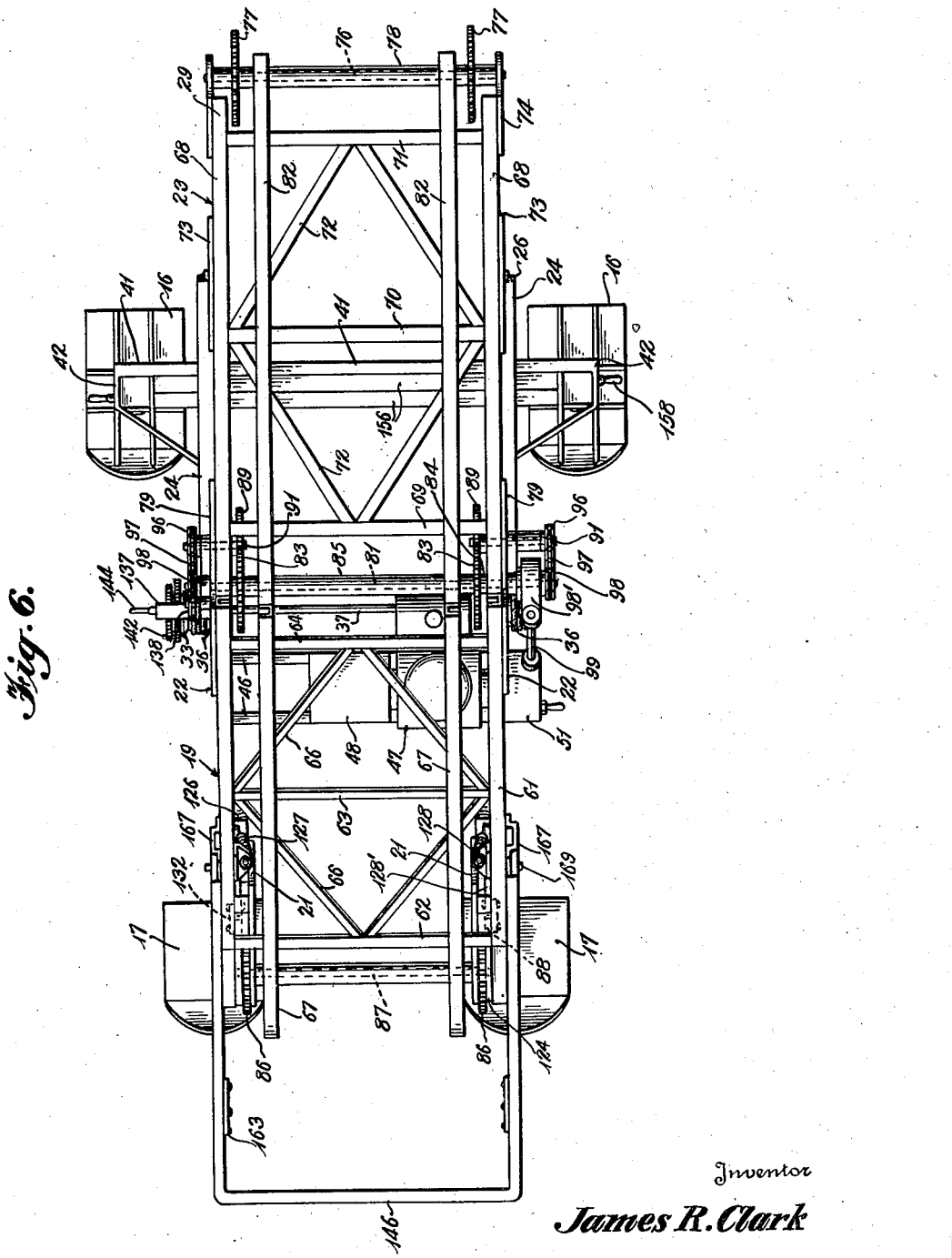
Inventor
James R. Clark
By Bacon & Thomas
Attorneys

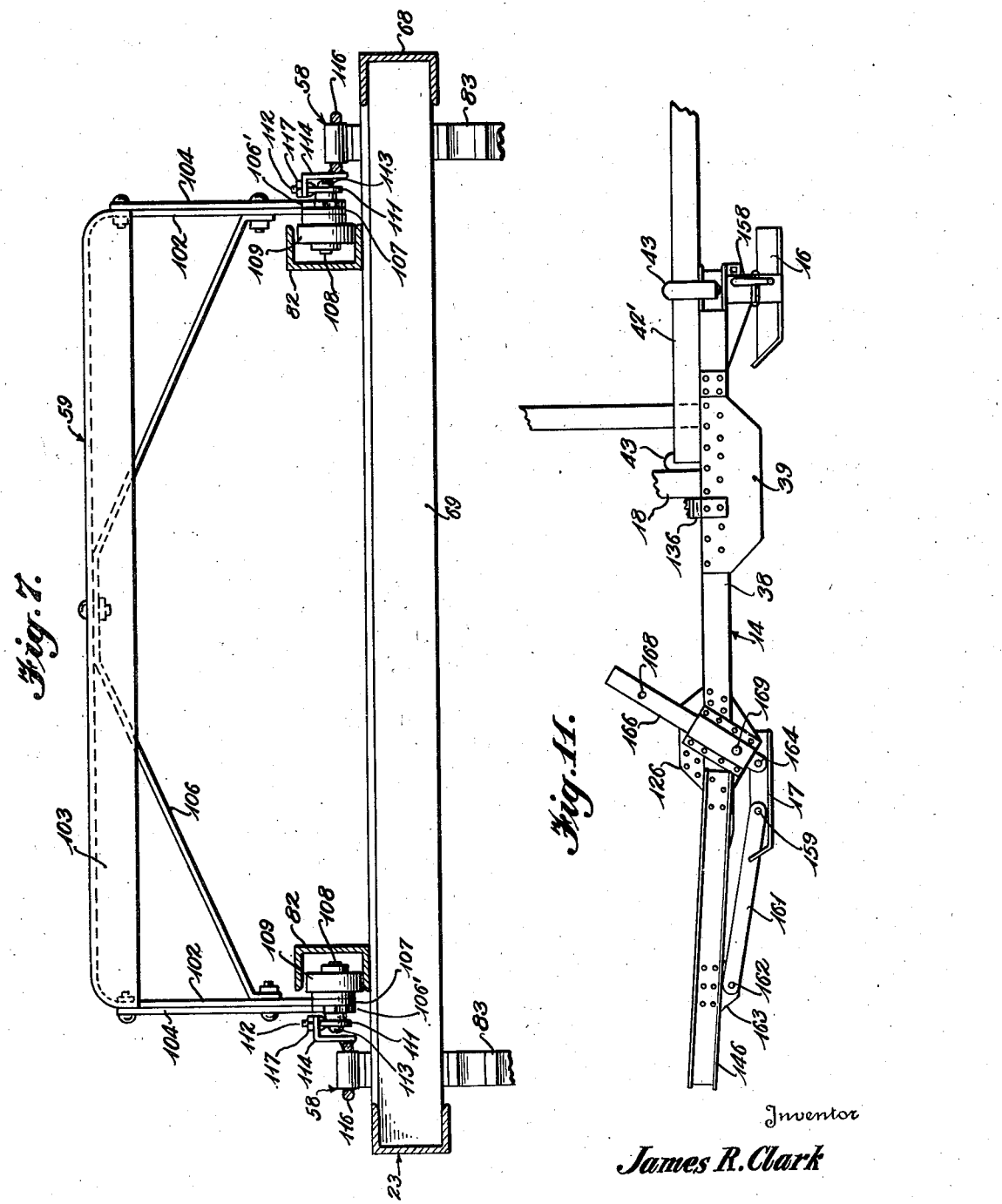

Patented Nov. 30, 1948

2,454,860

UNITED STATES PATENT OFFICE 2,454,860

PORTABLE ELEVATOR FOR LOADING TRUCKS

James R. Clark, Mobile, Ala.

Application January 29, 1946, Serial No. 644,001

2 Claims. (Cl. 198—233)

This invention relates to a loader and more particularly to a portable device for loading trucks, railroad cars, etc., or for elevating material during piling thereof.

The device of the present invention is particularly useful for loading pulpwood logs on trucks and may be attached to the body of a truck so as to be carried thereby. Logs or similar materials are carried up an incline by a conveyor provided with load carrying members and are deposited upon the truck by means of a vertically adjustable pivoted boom over which the conveyor also travels. The loader is also provided with retractable supports so that it may be operated while positioned upon the ground or other supporting surface. The device may then be employed to load trucks, railroad cars or to elevate material and may be moved from place to place on its own supporting members. The loader carries its own source of power and is preferably made throughout of lightweight metal such as aluminum alloy except for power driven elements and other elements subjected to wear.

An object of the present invention is therefore to provide an improved loader for elevating material onto trucks and the like.

Another object of the invention is to provide a power driven loading device which may be attached to a truck and carried thereby while the truck is being loaded.

Another object of the invention is to provide a loader in which a conveyor having load carrying members elevates material such as logs and distributes the material upon a truck or the like by the use of a vertically adjustable pivoted boom.

Another object of the invention is to provide a portable loading device carrying its own source of power for elevating and distributing material.

A further object of the invention is to provide a lightweight power driven loading device which may be attached to a truck to be carried thereby or which may be supported on the ground for loading materials onto trucks, cars, etc.

A still further object of the invention is to provide an improved loading device constructed principally of lightweight metal and provided with a chain conveyor equipped with anti-friction bearings engaging tracks of wear resisting metal.

Other objects and advantages of the invention will appear in the following description of a preferred embodiment thereof shown in the attached drawings of which Figure 1 is a side elevation of a loading device in accordance with the present invention;

Figure 2 is an end elevation of the base frame of the loader of Figure 1;

Figure 3 is a view similar to Figure 2 with parts broken away and showing the front skids retracted;

Figure 4 is a fragmentary vertical section taken on the lines 4—4 of Figure 2;

Figure 5 is a vertical section taken on the line 5—5 of Figure 1 with the conveyor chains and load carriers omitted;

Figure 6 is a plan view of the device with the conveyor chains and load carriers omitted;

Figure 7 is a front elevation of a load carrying device on an enlarged scale showing a portion of the boom structure in vertical section;

Figure 8 is a side elevation of the load carrier of Figure 7 showing details of the chain connectors;

Figure 9 is a fragmentary section taken on the line 9—9 of Figure 8;

Figure 10 is a fragmentary side elevation of the conveyor chain showing a portion of the chain connector mechanism; and Figure 11 is a side elevation showing the base frame only and the manner of attaching the frame to a truck.

Referring more particularly to Figure 1 of the drawings, the loader of the present invention includes a base frame 14 preferably built-up of aluminum or aluminum alloy shapes and provided with front and rear retractable skids 16 and 17, respectively. The base frame 14 may have a vertically extending central frame 18 secured thereto, the vertical frame 18 being braced by an inclined frame 19 secured to the base frame 14 by gusset plates 21 and to the top of the vertical frame 18 by gusset plates 22. A vertically adjustable pivoted boom 23 is pivotally secured to the top of the vertical frame 18 and may be provided with supporting members 24 having one end pivotally secured to the boom 23 at 26 and the other end provided with rollers 27 engaging vertical channel members 28 forming the side portions of the vertical frame 18. The free end 29 of boom 23 may be raised or lowered by raising and lowering the lower ends of the supporting members 24 for the boom 23. The raising and lowering mechanism includes cables 31 each having one end adjustably secured to the lower end of a supporting member 24 at 32. The cables 31 are threaded over pulleys 33 rotatably secured to the side channels 28 of the central frame member and have their other ends secured to drums 36 fixed upon a shaft 37, the drums 36 being manually rotatable as described in more detail below. Rotation of the drums 36 raises and lowers the lower ends of the supporting members 24 for the boom 23 to raise and lower the boom. The free end 29 of the boom can be lowered to a position near the upper level of the base frame 14 and also raised to a position approximately 30° above that shown in Figure 1.

The base frame 14 preferably includes side channel members 38 reinforced adjacent their centers with stiffening plates 39 to provide adequate support for the vertical frame 18. The base frame is widened at its front end by an elongated cross member 41 having its ends reinforced by members 42 to provide a widened support for the front skids 16 and also to make the front end of the frame approximately the same width as a truck body indicated at 42' in Figure 11. The elements indicated by numeral 42' comprise rearwardly extending frame elements of a truck. It is usual in operations of the type contemplated to employ a truck having an elongated body portion comprised essentially of two longitudinally extended beam elements (indicated by numeral 42' of Fig. 11) upon which logs or the like are piled transversely. The portion of the truck body shown in Fig. 11 is shown in side elevation and is a portion thereof extending rearwardly of the rear wheels of the truck, thus constituting rearwardly projecting frame portions with no obstructions therebelow. Thus, the front end of the frame 14 may be secured to the truck platform by suitable clamps indicated at 43 in Figure 11. When so clamped to the truck body the base frame portion 14 will extend rearwardly thereof for a short distance, and the boom of the loader will extend forwardly of the rear end of the truck to carry the logs being loaded to a position above a longitudinally intermediate portion of the truck with the logs already oriented transversely thereof to be lowered to the truck body and to be held thereby. During operation of the loader in the manner described the skids 16 and 17 will be retracted whereby the loader will be supported entirely by the truck without any portions thereof engaging the ground during loading operations. This figure shows the skids 16 and 17 retracted by mechanism described in detail below so that the entire loading device, the base frame only of which is shown in Figure 11, may be bodily carried by the truck.

The base frame 14 also includes a central reinforcing cross member 44 (Figure 5) and a pair of cross members 46 (Figure 6) for supporting a power unit shown as an internal combustion engine 47, a gear box 48 for driving a winch drum 49 (Figure 5) and a change gear box 51 (Figure 1) for driving the load carrying conveyor as described below.

The vertical frame 18 has the side channel member 28 thereof suitably braced by an intermediate cross member 56 (Figure 5) and X bracing members 57, the cross member 56 being sufficiently low to provide clearance for the return run of the conveyor chains 58 and load carrying devices 59 which return through the vertical frame 18 as shown in Figure 1. The upper ends of the side channel members 28 of the vertical frame are also held rigidly in position by the bracing of the inclined frame 19, the upper end of the inclined frame 19 being secured to the channel members 28 by gusset plates 22 (Figure 1). As shown in Figure 6, the inclined frame 19 is constructed of side channel members 61 connected together by cross members 62, 63 and 64 and also by angle bracing members 66. The cross members 62, 63 and 64 provide supports for steel channel members 67 which are suitably secured to the cross members and form tracks for rollers supporting the load carrying members as described below.

The boom 23 is also constructed of side channel members 68 connected together by cross members 69, 70 and 71 and is braced with angle bracing members 72. The boom is provided with central stiffening plates 73 (Figure 1) to which the boom supporting members 24 are pivoted and with end bearing plates 74 in which are secured the ends of a sprocket shaft 76. The sprocket shaft 76 has a pair of sprockets 77 (Figure 6) journalled thereon and is also enclosed in a spacer 78 which assists in bracing the free end 29 of the boom. The side members 68 of the boom are secured to bearing plates 79 at their other ends, the bearing plates being journalled (Figure 5) upon a central sprocket shaft 81 to provide for raising and lowering the boom. The cross members 69, 70 and 71 (Figure 6) provide support for a pair of steel channel members 82 which are in alignment with the similar channel members 67 secured to the inclined frame 19, the channel members 82 forming a continuation of the track for the conveyor.

As stated above, the conveyor includes two chains 58 and has its upper run supported upon the inclined frame 19 and the boom 23, Figure 1. The conveyor chains 58 run over idler sprockets 83 journalled on the shaft 81 which is in turn journalled in bearing members 84 (Figure 5) carried by the channels 28 forming part of the vertical frame 18. The shaft 81 is enclosed in a spacer member 85 which assists in bracing the upper end of the vertical frame 18. The chains also run on the idler sprockets 77 journalled on the shaft 76 carried by the free end 29 of the boom 23 and also run on adjustable idler sprockets 86 journalled on a shaft 87 adjustably supported in crossheads 88 carried by the base frame 14 as is hereafter more fully described. The lower run of the conveyor chains 58 also engage drive sprockets 89 secured to short shafts 91 journalled in bearing brackets 93 (Figure 5) secured to the channels 28 forming part of the vertical frame 18. The shafts 91 carrying the drive sprockets 89 are driven through sprockets 96 (Figure 1) secured to the shafts 91. The sprockets 96 are driven by chains 97 also engaging sprockets 98 fixed on the shaft 81 upon which the idler sprockets 83 are journalled. The shaft 81 is driven by a worm and worm gear mechanism 98', the details of which are not shown, it being understood that there is a worm gear (not shown) secured to the shaft 81 which meshes with a worm (not shown) secured to one end of a drive shaft 99 extending downwardly to the change gear box 51 forming part of the power unit including the internal combustion engine 47. It will be understood that the sprockets 89 are driven in a counterclockwise direction in Figure 1 from the engine 47 through the shaft 99, worm gear device 98', shaft 81, sprockets 98, chains 97, sprockets 96 and shafts 91 to cause the lower runs of the conveyor chains 58 to move to the left in Figure 1 and the upper runs of the chains 58 to move to the right.

The upper runs of the chains 58 are supported by the load carriers 59 so as to be held out of contact with the inclined frame 19 and the boom 23. The lower runs of the chains 58 in turn support the load carriers 59. The details of the load carriers are more clearly shown in Figures 7 to 10, inclusive. Each of the load carriers 59 includes a U-shaped member having vertically extending side portions 102 of bar or plate form and a horizontally extending portion 103 of angle cross section. The side portions 102 are secured to side standards 104, the load carrying members 59 being braced transversely by a bracing member 106 secured to the center of the horizontally extending portion 103 thereof and to the side portions 102 and side standards 104. As shown in Figure 8, the side standards 104 terminate at their lower ends in widened portions 106' which are secured to cross members 107. Stub shafts 108 carrying anti-friction, preferably ball, bearings 109 are secured in the ends of the cross members 107, the outer members of the anti-friction bearings being employed as rollers running in the interior of the steel channel members 82 of the boom 23 and also the steel channel members 67 of the inclined frame 19. The lower side of the steel channels thus provide a track for the anti-friction bearings 109 and the upper side of the channels prevent upward movement of the bearings 109 so as to hold the load carrying members 59 substantially perpendicular to the channels.

Figures 7 to 10, inclusive, also show how the chains 58 may be attached to the load carriers to enable the load carriers to travel around the various sprockets while still supporting the chains on their upper runs and being supported by the chains on their lower runs. A rocker member 111 provided with an upstanding threaded stud 112 may be pivotally connected to the side standard of a load carrier at 113. An angle member 114 may have an aperture in one arm thereof received on the stud 112 and have its other arm welded to a link 116 of the chain 58. The angle member 114 is locked on the stud 112 by a nut 117. The load carrier is also provided with a rocker member 118 pivoted thereto at 119 and provided with a laterally extending stud 121. The stud 121 is received in a slotted member 122 welded to another link 123 of the chain 58. The chain has sufficient lateral rigidity to hold the stud 121 in the slotted member 122 although the chain may be easily released from the load carriers by merely removing the nut 117 from the stud 112 and lifting the angle member 114 off the stud. The chain may then be moved laterally to disengage the stud 121 from the slotted member 122. The pivoted chain connectors in conjunction with the slotted member 122 enable the distance between the ends of spaced links of the chain to vary when the chain travels around a sprocket while the cross members of the load carriers form chords of the sprocket.

It will be apparent that raising and lowering the boom 23 will tend to shorten or lengthen the path of the chains 58. In order to keep these chains taut, the shaft 87 upon which the lower sprockets 86 are journalled are mounted in crossheads 88 (Figure 1) slidable in ways 124 secured to gusset plate 21 which joins the inclined frame 19 and the base frame 14, this gusset plate being spaced from the side channel beams 38 forming the side members of the base frame 14 and being secured to an attaching plate 126 in turn secured to the channel beams 38. The crossheads 88 may be urged downwardly in Figure 1 by means of springs 127 having one end adjustably secured to brackets 128 in turn secured to the channel beams 61 forming part of the inclined frame 19. The springs 127 each have their other ends secured to one arm of a bell crank lever 128', the bell crank levers being pivoted at 129 to brackets 131 secured to a side channel 38 of the base frame 14. A link 132 connects each bell crank lever 102 with its crosshead 88, the links being pivoted at 133 to the crossheads and at 134 to the bell crank levers 128'. It will be apparent that the springs 127 acting through the bell crank levers 128', links 132 and crossheads 88 resiliently urge the shaft 87 carrying the pulleys 86 in a downward direction in Figure 1 to tension the chains 58 while enabling the boom to be raised and lowered.

The mechanism for raising and lowering the boom 23 is most clearly shown in Figures 1 and 5. As shown in these figures, the shaft 37 carrying drums 36 has one end journalled in a bracket 136 secured to the reinforcing plate 39 in turn secured to a side channel beam 38 of the base frame 14. The other end of the shaft 37 is journalled in a bracket 137 secured to a reinforcing plate 39 on the opposite side of the base frame 14 and carries a gear 138 meshing with a pinion 139 forming part of a compound gear journalled on a stub shaft 141 supported by the bracket 137. The compound gear includes a large gear 142 secured to the pinion 139, the gear 142 meshing with a pinion 143 carried by a crank 144 also journalled in the bracket 137. It will be apparent that rotation of the crank 144 will rotate the shaft 37 and drums 36 through a gear train providing a large gear reduction. Rotation of the drums 36 raises or lowers the lower ends of the supporting members 24 for the boom 23 through the cables 31 to raise or lower the boom 23. The drums 36 may be locked in any desired position to prevent downward movement of the boom 23, for example, by a pawl (not shown) engaging the teeth of pinion 143.

The base frame 14 may have an extension 146 (Figures 1 and 6) providing a loading shelf extending from the left end of the device in Figure 1. This loading shelf may take the form of a U-shaped channel member having its ends attached to the side channel members 38 of the base frame 14. The loading shelf 146 preferably has a slight inclination downwardly toward the inclined frame 19 so that material placed on the loading shelf will tend to roll or slide downwardly and be picked up by the load carrying members 59. The load carrying members illustrated are particularly adaptable for elongated objects such as logs although other shaped members may be loaded by the device of the present invention, the form of the load carrying members being altered if necessary. It will be apparent that logs or other articles to be loaded will be carried up along the inclined frame 19 and over the boom 23 to be deposited upon a truck platform or other elevated member and that the ends of the articles being loaded will engage the steel channel members 67 and 82 so as to be maintained out of contact with the structural elements making up the slant frame 19 and boom 23. This enables all of the structural elements of the loading device with the exception of the steel channel members and the drive parts such as the sprockets, chains, roller bearings, and the shafts to be fabricated of aluminum or aluminum alloy so that the entire loading device may be of relatively light weight.

As discussed above with reference to Figure 11, the light weight of the device enables the entire loading mechanism to be fastened to the body or platform 42' of a truck and the skids 16 and 17 to be retracted so that the entire loading mechanism is carried by the truck. Under these conditions, the truck may be driven from place to place while being loaded. Widely scattered logs of pulpwood may be gathered and loaded on the truck without the necessity of manually piling the logs on the truck. Where the truck can not be brought close to heavy pulpwood logs, the winch drum 49 positioned below the base frame 14 and driven from the engine 47 through the speed reducing gear box 48 may be employed to drag such logs to the loader. It will be apparent that a cable or rope may be looped around the winch drum and have one end attached to a pulpwood log by any suitable attaching means and be employed to draw the logs to the loading position. The winch drum 49 can, of course, be employed either when the loading device is attached to a truck or when it is supported upon the skids 16 and 17.

The mechanism for retracting the front skids 16 is most clearly shown in Figures 2, 3 and 4. The skids 16 are pivotally secured at 147 to standards 148 which are hinged at 149 to members 151 secured to and depending from the base frame 14. Bracing members 152 each have their lower ends pivoted at 153 to a skid 16 and their upper ends pivoted to a crosshead 154. As shown more clearly in Figure 4, the crossheads 154 are slidable in channels 156 secured to the lower surface of the base frame 14 and have a threaded bore engaging threaded rods or worms 157. The worms 157 extend transversely of the base frame 14 and are journalled in the members 151. The worms receive removable handcranks 158 enabling independent rotation of the worms. Rotation of the worms 157 so as to move the crossheads 154 outwardly toward the sides of the base frame 14 will retract the skids 16 into the position shown in Figure 3 and it is apparent that reverse rotation of the worms 136 will again move the skids 16 to the position shown in Figure 2.

The mechanism for retracting the rear skids 17 is shown most clearly in Figures 1 and 11. The skids 17 are pivotally connected at 159 to one end of supports 161 which have their other ends pivotally connected at 162 to brackets 163 secured to the side members of the loading shelf 146. The skids 17 are also pivotally connected at 164 to supporting members 166 which are slidably secured in brackets 167 secured to the side channel members 38 of the base frame 14 and to the attaching plate 126. The supporting members 166 are provided with apertures 168 for receiving a pin 169 which also extends through apertures in the bracket 167. The pins 169 may be removed, the skids 17 elevated from the position shown in Figure 1 to the position shown in Figure 11 and the pins reinserted to hold the skids in elevated position.

It will be apparent that I have provided a loading device which can be constructed of lightweight metal so as to be easily moved from place to place or carried by a truck while loading the same and which incorporates a chain conveyor movable over an adjustable boom for elevating and distributing articles or material to be loaded. The conveyor does not, however, engage the lightweight metal of the structural elements of the loader but runs on anti-friction bearings engaging tracks of wear resisting metal which also support the material being loaded. The loader is provided with a self contained power unit and also has provision for pulling objects such as logs to the loading device which can be employed when the loader is either self-supported or mounted on a vehicle.

It is to be understood that although I have disclosed my device as constructed principally of aluminum or aluminum alloy shapes I contemplate that other metals of low density, such for instance as magnesium, may be used. Accordingly, where the claims refer to a lightweight metal it is intended to cover any such metals of low density.

While I have disclosed the preferred embodiment of my invention, it will be understood that the details thereof may be varied within the scope of the following claims.

I claim:

1. In a loading device, a lightweight metal frame providing a support for a power unit and having a base frame portion and an upwardly extending portion providing an inclined portion, a boom having one end pivotally secured to the upper end of said upwardly extending portion to provide for raising and lowering said boom, a conveyor having endless conveyor elements and providing an upper run extending over said inclined portion and said boom and a lower run returning through the upwardly extending portion of said frame, drive means for driving said conveyor elements from said power unit, and means for raising and lowering said boom, said device being provided with retractable supporting members for supporting said frame, one end of said base frame portion having horizontally extending portions engageable with and releasably attachable to rearwardly extending portions of a truck body to enable said device to be carried by said truck during operation of said device and when said supporting members are retracted.

2. In a loading device, a lightweight metal frame providing a support for a power unit and having a base frame portion and an upwardly extending portion providing an inclined portion, a boom having one end pivotally secured to the upper end of said upwardly extending portion to provide for raising and lowering said boom, an endless conveyor having an upper run extending over said inclined portion and said boom and a lower run returning through the upwardly extending portion of said frame, drive means for driving said conveyor from said power unit and means for raising and lowering said boom, one end of said base frame portion extending horizontally forwardly below said boom and beyond said upwardly extending portion, said extending portion having an unobstructed upper surface whereby it may be releasably attached to the undersides of rearwardly extending elements of a truck body to enable said device to be carried by said truck during operation of said device.

JAMES R. CLARK.

REFERENCES CITED

The following references are of record in the file of this patent:

UNITED STATES PATENTS

| Number | Name | Date |
| --- | --- | --- |
| 542,996 | Dick | July 23, 1895 |
| 552,716 | Matthiessen | Jan. 7, 1896 |
| 736,385 | Hamilton | Aug. 18, 1903 |
| 755,333 | Torney | Mar. 22, 1904 |
| 1,045,045 | Larson | Nov. 19, 1912 |
| 1,095,077 | Brown et al. | Apr. 28, 1914 |
| 1,459,524 | Wright | June 19, 1923 |
| 1,845,127 | Clark | Feb. 16, 1932 |

FOREIGN PATENTS

| Number | Country | Date |
| --- | --- | --- |
| 472,215 | France | July 30, 1914 |